June 6, 1961  P. C. EMMONS ET AL  2,986,877
ROTATABLE AFTERBURNERS FOR JET AIRCRAFT
Filed March 7, 1957  3 Sheets-Sheet 1

INVENTORS
PAUL C. EMMONS,
ALBRECHT V. HUEGEL,
AND MARVIN M. McEUEN
BY
ATTORNEYS

June 6, 1961  P. C. EMMONS ET AL  2,986,877
ROTATABLE AFTERBURNERS FOR JET AIRCRAFT
Filed March 7, 1957  3 Sheets-Sheet 2

INVENTORS
PAUL C. EMMONS,
ALBRECHT V. HUEGEL
AND MARVIN McCUEN
BY
ATTORNEYS

INVENTORS
PAUL C. EMMONS,
ALBRECHT V. HUEGEL
AND MARVIN McEUEN
BY
ATTORNEYS

United States Patent Office 2,986,877
Patented June 6, 1961

2,986,877
ROTATABLE AFTERBURNERS FOR JET AIRCRAFT
Paul C. Emmons, Buffalo, Albrecht V. Huegel, Wilson, and Marvin M. McEuen, Kenmore, N.Y., assignors to the United States of America as represented by the Secretary of the Air Force
Filed Mar. 7, 1957, Ser. No. 650,060
4 Claims. (Cl. 60—35.55)

The invention relates generally to a turbo-jet engined aircraft having rotatable afterburner sections and more particularly to a means for providing a jet aircraft capable of vertical takeoffs and landings wherein the pilot and airframe remain in their normal flight position.

It is well known that high speed jet aircraft require substantially level and lengthy areas for taking off and landing. The ideal aircraft should be able to take off and land with little forward movement and yet be capable of attaining high speeds and high altitudes. An aircraft of this type would be a valuable tactical unit especially for carrier based operations and for military operations where it becomes necessary to base aircraft at locations where airport facilities are poor or absent. The added safety factor attained by eliminating the necessity of extensive runways is also particularly advantageous.

Accordingly, it is a primary object of this invention to provide a jet propelled aircraft capable of substantially vertical take-off and landing yet able to attain high speeds in the supersonic range and altitudes equal to other more conventional jet aircraft.

Another object of the invention is to provide a jet propelled aircraft capable of vertical take-off and landing in which the pilot and airframe remain in normal flight attitude.

A further object of the invention is to provide a jet aircraft with rotatable afterburner sections which may be directed in such a manner that the thrust from the engines lifts the aircraft in a substantially vertical direction and on reaching an optimum altitude said thrust may then be directed rearward so that the full power of the engines works to propel the aircraft in the conventional manner.

The advantages of this type of aircraft are many and include particularly the elimination of the take-off safety point and landing distance considerations. The take-off safety point may be defined as the point at which the take-off safety speed is first attained. Since the present invention provides for an airplane capable of substantially vertical take-off, the point at which said safety take-off speed is attained is relatively unimportant.

The landing distance is another important consideration which is practically eliminated in an aircraft of the type described. Conventional jet propelled aircraft require extremely lengthy runways in order to land safely and even under ideal conditions wheel brakes, wing flaps, or parachute type brakes are necessary for keeping the landing distance within a safe and reasonable minimum distance. The present invention eliminates the consideration of landing distance because, by rotating the afterburners, the aircraft stops its forward motion and hovers until the upward thrust is reduced to a point where the weight of the aircraft itself overcomes this thrust and causes a steady descent until the ground is reached.

The flying qualities of the aircraft described are comparable with conventional aircraft having fixed afterburners. When the aircraft is in flight position after take-off, the controllability and stability are not impaired by its unique characteristic of being able to take off or to be vertically landed.

For many years there have been in existence many types of rotary wing aircraft capable of vertical take-off and landing. However, the principal disadvantage of this type of aircraft is its low airspeed. Top speed of rotary wing aircraft is on the order of 200 miles per hour. The present invention provides an aircraft which has most of the advantages of rotary wing aircraft plus the additional advantages of much higher airspeed and greater maneuverability.

Another type of vertical take-off and landing aircraft is one in which the airframe is in a vertical attitude before flight. The disadvantage of this type lies in the unorthodox positions necessary to accomplish the desired result. Since the airframe is vertical the pilot must be placed so that his back is parallel with the ground in order that he may see the instruments and be in the proper position when the aircraft transforms into its normal flight position. The aircraft which is the subject of the present invention has none of the above-mentioned disadvantages but has the advantage of vertical take-off and landing.

These and other objects, features and advantages will become more apparent after considering the following detailed description taken in connection with the annexed drawings and the appended claims.

Figure 1:
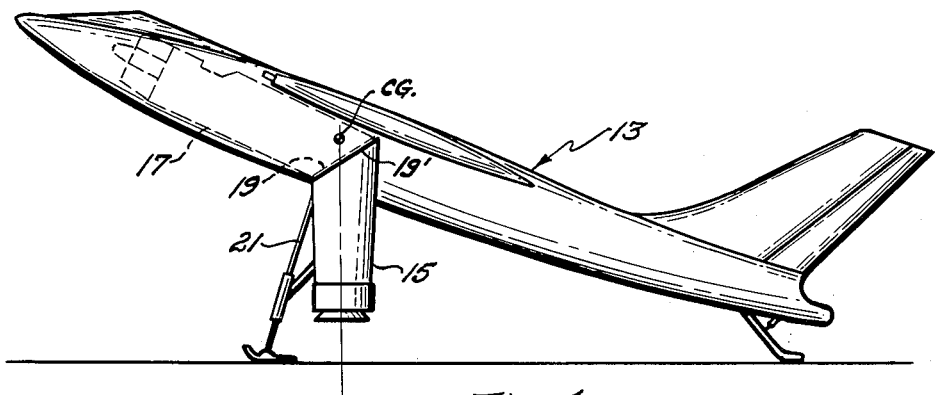
FIG. 1 is a schematic side elevation view of an aircraft in the take-off and landing position in which the present invention is utilized.

Referring now to FIG. 1, there is shown a side view of the aircraft 13 with the jet engine afterburner or exhaust section 15 in the take-off and landing position. The effective thrust works to lift or lower the airframe in a substantially vertical direction even though the said airframe is in a normal flight attitude. The forward section 17 of the engine consists of a conventional turbo jet power plant to a point just aft of the turbine. At this point 19 there is situated a circular flange disposed at a substantial angle to the axis of forward section 17 and which is shown in detail in FIGS. 4, 5 and 6. Also, the aft section 15 of the engine is equipped with a corresponding flange 19 similar to the one on the forward section and mounted so as to be adjacent to the one on the forward section. The flanges facilitate the rotation of the exhaust or afterburner section 15. The adjacent portions of the aft and forward sections 15, 17 are shaped as complementary spherical portions.

Figure 2:
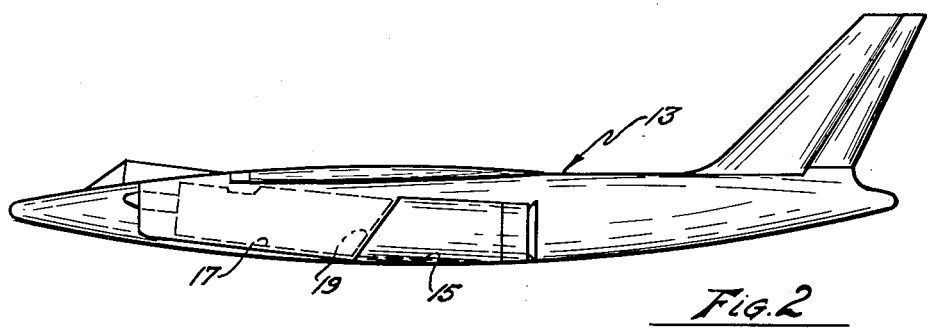
FIG. 2 shows a side elevation view of the aircraft of FIG. 1 in normal flight position.

The aircraft 13 is shown in normal flight position in FIG. 2. The transition from vertical take-off has been accomplished by rotating the afterburner section 15 through 180° in order to acquire the necessary 67° of angular displacement. The landing gear 21 (FIG. 1) has been retracted to flight position.

Figure 3:
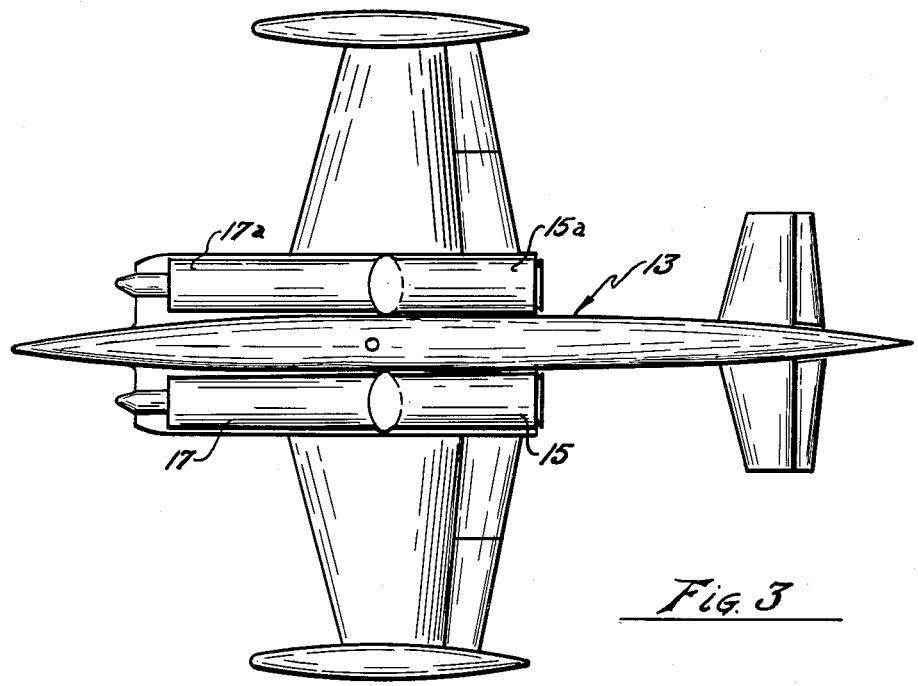
FIG. 3 is a plan view of the aircraft of FIG. 1 in flight position showing the installation locaton of the two jet engines in the aircraft.

The view of the aircraft in flight and the placement of the turbo jet engine forward sections 17 and 17a and aft sections 15 and 15a in the airframe is shown in FIG. 3. As will be seen from FIGS. 2 and 3 when the aircraft is in flight position, it appears and functions, for all practical purposes, like other conventional jet aircraft. This characteristic accounts for its unusual value as a tactical unit in combat actions.

Figure 4:
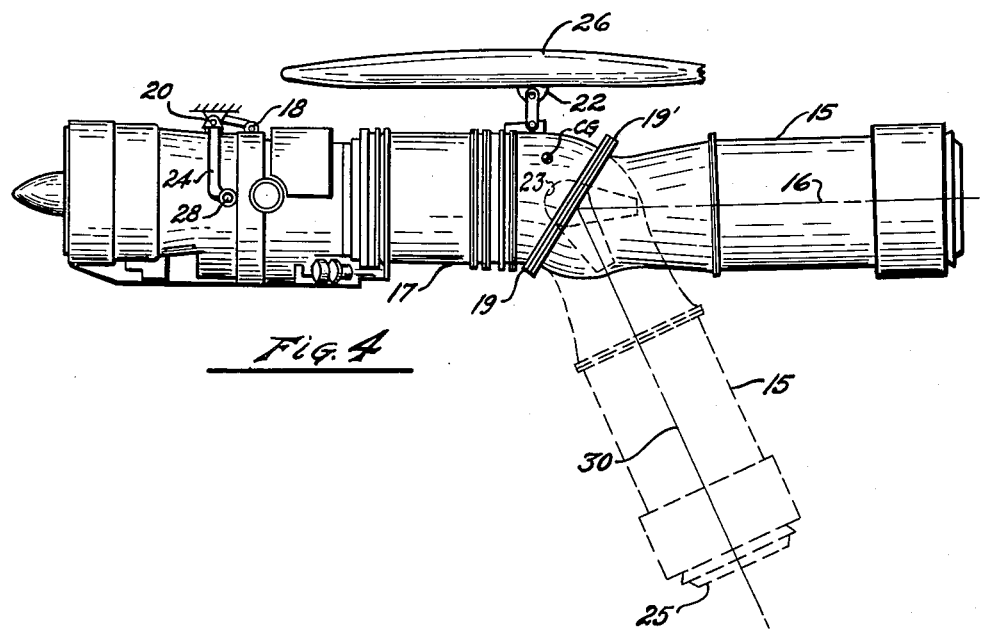
FIG. 4 is a detailed view in side elevation of the turbo jet engine showing the rotatable feature of the afterburner section.

There is shown a more detailed view of one of the turbo jet engines itself in FIG. 4. The forward section 17 is attached to the aft or exhaust section 15 by means of circular flanges 10. The spherical cone 23, located aft of forward section 17, serves as a baffle to direct the jet stream toward the exhaust openings 25. It will be noted that the aft end of the turbine section 17 forms part of a sphere which is complemented by the forward end of the exhaust section 15. The engine is attached to the aircraft by the engine mount 22 fastened to the wing 26 taking the up load. The engine mount harness 24 is fastened to the fuselage and takes forward and aft loads at point 20, side loads at point 18 and up load at point 28. In the view as shown both the take-off and flight positions are depicted.

Figure 5:
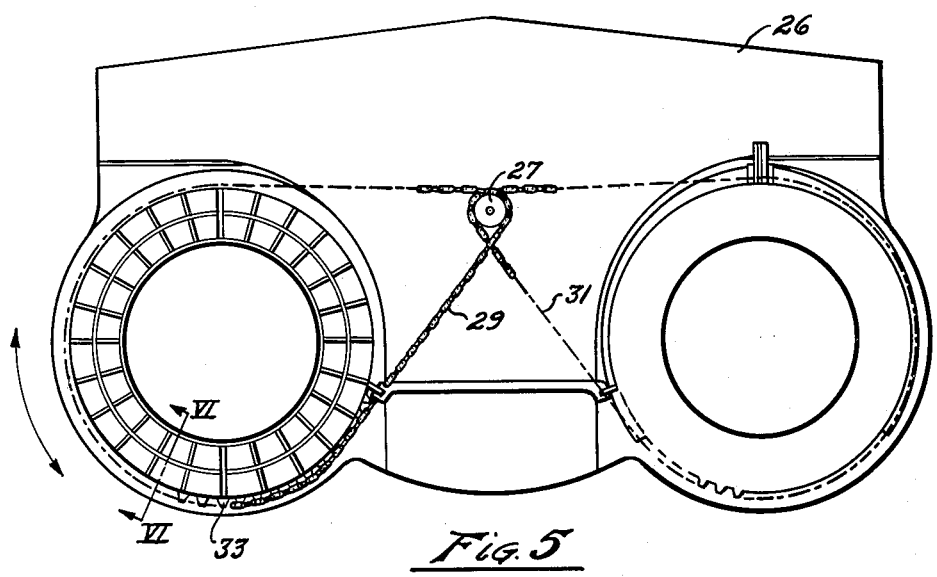
FIG. 5 shows the details of means used to rotate the afterburner or exhaust section of the engine including the chain, sprocket, and rotating drum installation.

A means which may be used for rotating the afterburner or exhaust section 15 (FIG. 4) is shown in FIG. 5. Two counter rotating drums 27 driven by an electric motor (not shown) are mounted in the plane of rotation of the flanges and operate to drive the chains 29 and 31. Said chains 29 and 31 are engaged to sprockets 33 which are mounted on the flanges of the aft sections of each engine.

Ordinarily, when the aircraft is ready for take-off the afterburner or exhaust section 15 is pointing downward 67° from the centerline 16. When the aft section is in the down position the thrust force line 30 passes through the center of gravity of the aircraft. The thrust of the engine is then increased until the aircraft leaves the ground in a substantially vertical direction and at the desired altitude the pilot actuates the electric motor which drives the counter rotating drums 27 thereby moving the chains 29 and 31 connected to the sprockets 33 mounted on the aft section flanges 19'. This causes the aft section 15 to rotate and as a result of the angle of the flanges 19, said aft section 15 also turns outward and upward until it has through 180° and lies substantially parallel with the engine centerline 16. Thus the original angular displacement of 67° no longer exists and the aircraft functions as a conventional jet propelled airplane.

Figure 6:
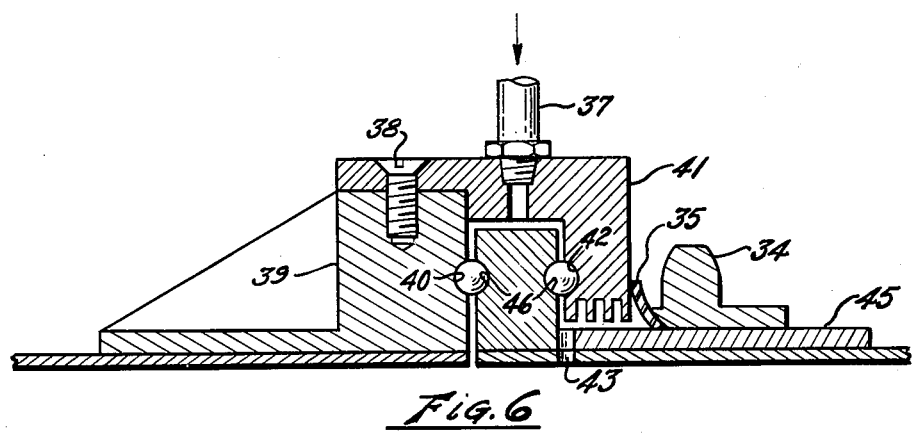
FIG. 6 is a detailed cross-sectional view along the line VI—VI of FIG. 5 showng the bearing system used in the rotation of the aft section including the paths of the compressed air used for cooling purposes.

A view taken along the line VI—VI of FIG. 5 is depicted by FIG. 6. The detail of the rotating bearing surfaces may be clearly seen. The flange 39 is attached to the forward or turbine section of the engine. Said forward section flange 39 would contain one of the outer bearing races 40. The aft section or afterburner would have the flange 45 attached to it which would contain the bearing race 46 which would constitute the inner races of the bearing. The retainer member 41 would contain the other outer race 42 and would be affixed to the forward section flange 39 by means of the screw 38. Said retainer member 41 would also contain an inlet 37 through which compressed air may be pumped for the purpose of cooling the bearings.

A dust cover disc 35 would be attached to the aft flange 45 for the protection and sealing of the rotating mechanism. Also attached to the aft flange 45 is the sprocket tooth ring 34 which would be driven by the chain 29 or 31 (FIG. 5) for rotating said aft section by means of flange 45. Outlet ports 43 would be included in the aft section flange 45 to dissipate the circulated compressed air used to cool the bearing.

The arrangement described above enables a vertical take-off by keeping the thrust centerlines in a plane passing through the airplane center of gravity thereby reducing the tendency of forward motion during take-off and assuring essentially vertical movement.

From the foregoing it may be readily seen that by the means described the propulsion forces of the turbo jet engines which propel the aircraft through the air may also be readily utilized to lift said aircraft in a substantially vertical direction as well as to allow hovering and vertical lowering and landing.

Although the invention has been described with reference to particular embodiments it will be understood to those skilled in the art that various changes and modifications can be made therein without departing from the invention. We intend, therefore, that all matter contained in the above description or shown in the accompanying drawings shall be interpreted in the illustrative sense and it is aimed in the appended claims to cover all such changes and modifications without departing from the true spirit and scope of the invention.

What is claimed is:

1. In a jet propelled aircraft having a plurality of turbo jet engines, said engines including fixed forward combustion sections and rotatably connected exhaust sections, said rotatable exhaust sections being attached such that said forward combustion section is in axial alignment therewith while in normal operating position, means for rotating said exhaust sections comprising motor driven counter rotating drums, chains driven by said counter rotating drums, sprockets mounted on said rotatably connected exhaust sections and driven by said chains, and means for controlling the rotation of said exhaust sections whereby their angular position determines the direction of movement of the aircraft and permits vertical take-off and landing as well as forward flight of the aircraft.

2. The invention as claimed in claim 1 wherein said rotatably connected exhaust sections include afterburner units mounted therein.

3. In a jet propelled aircraft having a plurality of turbo jet engines, said engines including fixed forward combustion sections and rotatably connected exhaust sections, adjacent angularly mounted flanges attached to the aft ends of said fixed forward sections and to the forward ends of said exhaust sections, friction reducing means for retaining said flanges adjacent to each other while allowing relative rotation between said flanges, toothed sprockets integrally mounted on said rotatable exhaust section flanges, means for rotating said exhaust section comprising motor driven counter rotating drums, chains driven by said drums and engaging with said toothed sprockets, rotation of said drums resulting in a corresponding rotation of the rotatable exhaust sections, and control means for determining the direction of movement of the aircraft by angularly positioning said exhaust sections.

4. In a turbo jet aircraft engine having a rotatably connected exhaust section and a fixed forward combustion section integrated by a plurality of flanges, the first of said flanges angularly mounted on the aft end of said fixed forward section, another of said flanges mounted at the same angle on the forward end of the exhaust section adjacent to the first flange, a retaining member for keeping said flanges adjacent to each other, bearing means for allowing rotation of said exhaust section in relation to said forward section, said bearing means comprising a series of spherical members retained by said flanges and retaining member, means for rotating said exhaust section comprising motor driven counter rotating drums, chains driven by said drums and engaging with integrally mounted sprockets on said rotatable exhaust section, and means for controlling the rotation of said exhaust section whereby the direction of movement of the aircraft in which said engine is installed is controlled by the angular position of said exhaust section and permits substantially vertical take-off and landing as well as forward propulsion of said aircraft.

References Cited in the file of this patent

UNITED STATES PATENTS

| | | |
|---|---|---|
| 1,642,752 | Landon | Sept. 20, 1927 |
| 2,518,697 | Lee | Aug. 15, 1950 |
| 2,537,487 | Stone | Jan. 9, 1951 |

(Other references on following page)

UNITED STATES PATENTS

| | | |
|---|---|---|
| 2,589,732 | Riviere | Mar. 18, 1952 |
| 2,639,582 | Pearlman | May 26, 1953 |
| 2,734,698 | Straayer | Feb. 14, 1956 |
| 2,759,686 | Griffith | Aug. 21, 1956 |
| 2,770,095 | Ashwood et al. | Nov. 13, 1956 |
| 2,780,424 | Price | Feb. 5, 1957 |
| 2,857,740 | Hall et al. | Oct. 28, 1958 |
| 2,886,262 | Fletcher | May 12, 1959 |
| 2,928,238 | Hawkins | Mar. 15, 1960 |
| 2,933,891 | Britt | Apr. 26, 1960 |

FOREIGN PATENTS

| | | |
|---|---|---|
| 506,664 | Belgium | May 21, 1954 |
| 968,948 | France | May 10, 1950 |
| 720,394 | Great Britain | Dec. 22, 1954 |
| 755,019 | Great Britain | Aug. 15, 1956 |